United States Patent
Kilner et al.

(10) Patent No.: US 8,028,008 B2
(45) Date of Patent: Sep. 27, 2011

(54) SYSTEM AND METHOD FOR OPTIMIZING WRITE BARRIER IN GARBAGE COLLECTION

(75) Inventors: Matthew Roy Kilner, Bournemouth (GB); Andrew Dean Wharmby, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 12/237,939

(22) Filed: Sep. 25, 2008

(65) Prior Publication Data
US 2010/0082710 A1    Apr. 1, 2010

(51) Int. Cl.
G06F 12/00    (2006.01)
G06F 17/30    (2006.01)

(52) U.S. Cl. ........................................ 707/813; 707/820
(58) Field of Classification Search ................. 707/813
See application file for complete search history.

(56) References Cited

U.S. PATENT DOCUMENTS
6,049,810 A * 4/2000 Schwartz et al. ................ 1/1
6,148,310 A   11/2000 Azagury et al.
7,565,499 B1 * 7/2009 Garthwaite .................. 711/159

OTHER PUBLICATIONS

Detlefs, David et al., Concurrent Remembered Set Refinement in Generational Garbage Collection, Proceedings of USENIX Java (tm) VM '02 Conference, Aug. 1-2, 2002, San Francisco, CA, 14 pages.

Detlefs, David et al., Concurrent Remembered Set Refinement in Generational Garbage Collection. [online]. 31 pages. [retrieved on Sep. 25, 2008]. Retrieved from the Internet:<URL: http://research.sun.com/people/detlefs/talks/02-07-conc-refine.PDF>.

Hosking, Antony L. et al., A Comparative Performance Evaluation of Write Barrier Implementations, Proceedings ACM Conference on Object-Oriented Programming Systems, Languages, and Applications, Vancouver, Canada, Oct. 1992, pp. 92-109.

Hosking, Antony L. et al., Remembered Sets Can Also Play Cards, OOPSLA'93 Workshop on Garbage Collection and Memory Management, Object Systems Laboratory, Dept. of Comp. Science, Univ. of Massachusetts, Amherst, MA, 8 pages.

* cited by examiner

*Primary Examiner* — John E Breene
*Assistant Examiner* — Joshua Bullock
(74) *Attorney, Agent, or Firm* — Schmeiser, Olsen & Watts; Jeanine Ray-Yarletts

(57) ABSTRACT

A system and associated method for optimizing a write barrier in garbage collection. The method marks a bit in a bitmap corresponding to a slot when the slot content is modified to refer to a new object. The method also logs the address of the slot when the object referred by the slot is updated. The method pops the address of the slot to clean from the log and clears the bit corresponding to the slot in the bitmap and when the object referred to by the slot is not already marked, marking said object and pushing its address to the mark stack. When the slot is located within an active object range, the method puts the address of the slot in a deferred log for a later processing.

3 Claims, 4 Drawing Sheets

CONCURRENT CLEANING BY MUTATOR

CONCURRENT GARBAGE COLLECTION SYSTEM

CONCURRENT MARKING BY OPTIMIZED WRITE BARRIER

CONCURRENT CLEANING BY MUTATOR

SYSTEM AND METHOD FOR OPTIMIZING WRITE BARRIER IN GARBAGE COLLECTION

FIELD OF THE INVENTION

The present invention discloses a system and associated method for improving the efficiency of conventional write barriers as used in garbage collection, specifically addressing storage usage, processing overhead and reduction of floating garbage.

BACKGROUND OF THE INVENTION

In concurrent garbage collection, conventional write barriers utilize either bit marking or address logging to remember the address of all objects that have had references updated. A conventional address logging write barrier requires extra storage space to keep the addresses of updated objects for all updates, resulting in memory overhead. A garbage collector employing a conventional bit marking write barrier has processing overhead of re-scanning multiple objects to identify the latest updates. Also, either of conventional write barrier method creates uncollectible floating garbage because objects may become unreachable after being marked during a concurrent marking phase. Conventional write barrier methods have disadvantages with regard to floating garbage, processing overhead and memory overhead.

Thus, there is a need for a system and associated method that overcomes at least one of the preceding disadvantages of current methods and systems for implementing a write barrier in garbage collection.

SUMMARY OF THE INVENTION

The present invention provides a method for optimizing a write barrier for a garbage collection, the method comprising:
 allocating an object that is referred by a data value of a slot;
 storing a dirtiness indicator of the slot in a bitmap and an address of the slot in a log; and
 subsequent to said storing, rescanning the log to discover an update to the stored address of the slot,
 wherein a mutator performs said storing and said rescanning, wherein the mutator is a thread of execution in a virtual machine that performs the garbage collection.

The present invention provides a computer program product, comprising a computer usable storage medium having a computer readable program code embodied therein, said computer readable program code containing instructions that when executed by a processor of a computer system implement a method for optimizing a write barrier for a garbage collection, the method comprising:
 allocating an object that is referred by a data value of a slot;
 storing a dirtiness indicator of the slot in a bitmap and an address of the slot in a log; and
 subsequent to said storing, rescanning the log to discover an update to the stored address of the slot,
 wherein a mutator performs said storing and said rescanning, wherein the mutator is a thread of execution in a virtual machine that performs the garbage collection.

The present invention provides a computer system comprising a processor and a computer readable memory unit coupled to the processor, said memory unit containing instructions that when executed by the processor implement a method for optimizing a write barrier for a garbage collection, the method comprising:
 allocating an object that is referred by a data value of a slot;
 storing a dirtiness indicator of the slot in a bitmap and an address of the slot in a log; and
 subsequent to said storing, rescanning the log to discover an update to the stored address of the slot,
 wherein a mutator performs said storing and said rescanning, wherein the mutator is a thread of execution in a virtual machine that performs the garbage collection.

The present invention provides a method and system that overcomes at least one of the current disadvantages of conventional method and system for implementing a write barrier for garbage collection.

DETAILED DESCRIPTION OF THE INVENTION

Figure 1:
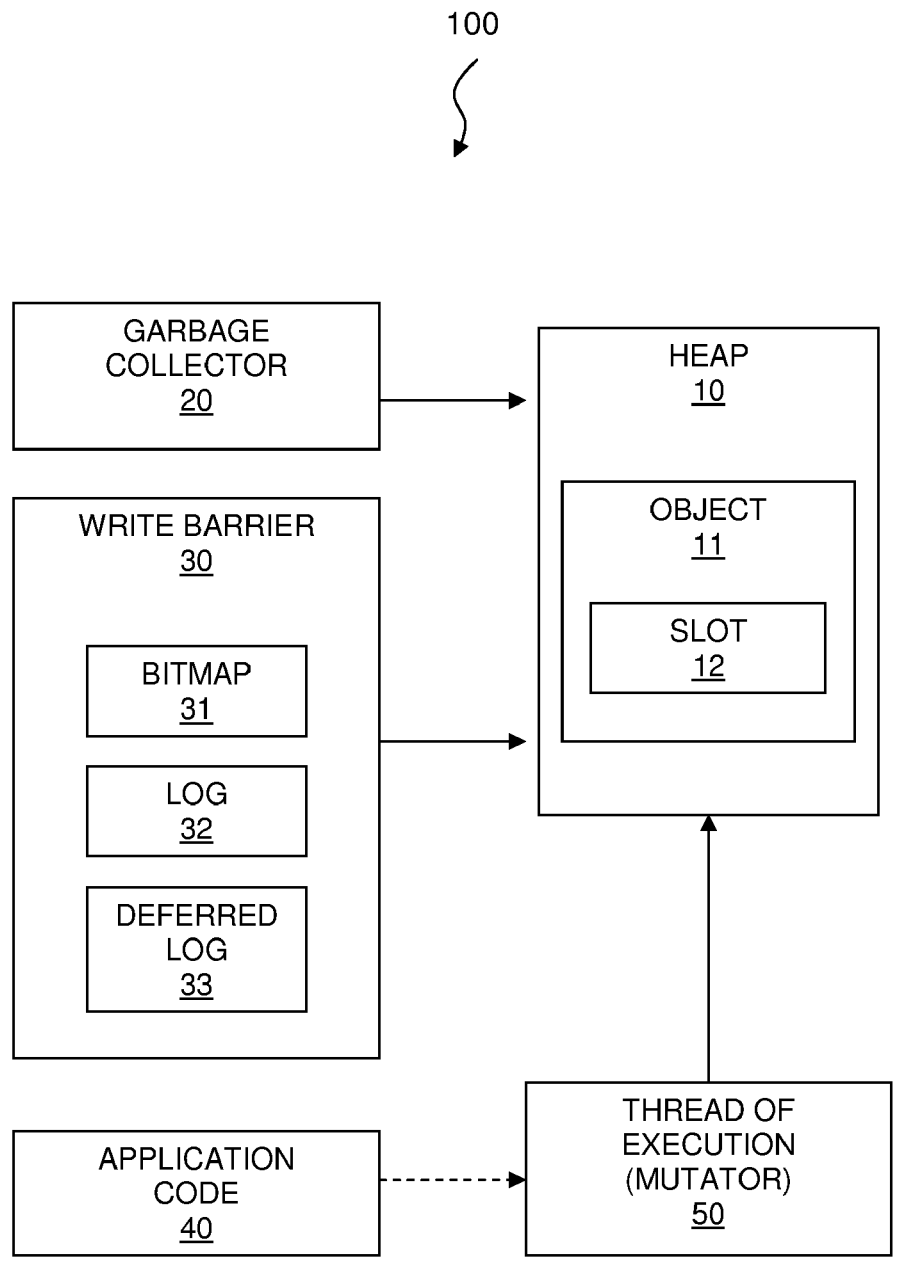
FIG. 1 illustrates an optimized write barrier within a managed runtime, in accordance with the embodiments of the present invention.

FIG. 1 illustrates a concurrent garbage collection system 100 for optimizing a write barrier, in accordance with the embodiments of the present invention. The concurrent garbage collection system 100 comprises a runtime environment, at least one application code, and at least one thread of execution.

The runtime environment comprises a heap 10, a garbage collector 20, and a write barrier 30. The heap 10 comprises at least one object. The write barrier 30 comprises a bitmap 31, a log 32, and a deferred log 33. Examples of the runtime environment may be, inter alia, Java Runtime Environment® (JRE®), etc. (Java Runtime Environment and JRE are registered trademarks of Sun Microsystems, Inc., in the United States and other countries.)

The heap 10 is a region of memory for at least one object. An object 11 of said at least one object is an element of the application program 40 running on the runtime environment. An active object range is a part of the heap 10 comprising recently allocated objects that are actively accessed and more likely to be modified, i.e., mutated, than older objects by processes in the runtime environment. The object 11 may or may not be in the active object range.

The object 11 is a contiguous address area within the heap 10 comprising at least one slot. A slot 12 of said at least one slot is a memory location that contains various types of data such as data values, memory addresses, i.e., references, referring to another memory location, etc. An address of the slot 12 is written into the log 32 or the deferred log 33 pursuant to the method of the present invention. See descriptions of FIGS. 2 and 3, infra, for details.

The write barrier 30 is a software element that marks a mutated memory area in the heap 10 when a mutation occurs. See descriptions of FIG. 2, infra, for details. The write barrier 30 utilizes auxiliary data structures comprising the bit map 31, the log 32, and the deferred log 33.

The bit map 31 of the write barrier 30 is used to mark a slot that has been mutated.

The log 32 of the write barrier 30 is used to log an address of the slot referring an object that has been mutated and should be processed for a garbage collection.

The deferred log 33 of the write barrier 30 used to log an address of the slot referring an object that has been mutated but not required to be immediately processed for a garbage collection due to a prospect of frequent mutation in the future. See description of step 360 in FIG. 3, infra, for details.

An application code 40 of said at least one application code runs on the runtime environment. Throughout this specification, the term thread and the term "thread of execution" are used interchangeably.

The mutator 50 is a thread of said at least one thread executing the application code 40 that interacts with and modifies said at least one object in the heap 10. Such modification of objects is also referred to as mutation.

The garbage collector 20 locates and reclaims objects in the heap 10 that are no longer in use, i.e., garbage, "dead" objects, etc. The garbage collector 20 in this specification executes concurrently with the mutator 50 and other threads in the runtime environment. In a concurrent garbage collection, a live object graph is mapped during application execution, and employs the write barrier to maintain a record of mutations such that a live object should not be collected by the garbage collector.

A cycle of concurrent garbage collection of the present invention comprises a concurrent marking phase and a concurrent cleaning phase, which are then followed by a traditional mark-sweep-compact garbage collection cycle. A runtime environment repeats the garbage collection cycle periodically. The concurrent marking phase and the concurrent cleaning phase are executed by a mutator that allocates a new object. A plurality of mutators and the concurrent garbage collection phase execute concurrently. During the concurrent marking phase, the plurality of mutators in the runtime environment concurrently executes the optimized write barrier. A mutation to an object may occur after the object is marked during the concurrent marking phase.

During the concurrent marking phase, the concurrent garbage collector marks all "live" objects that are reachable to keep such live objects from being collected in the sweeping phase. All live objects that are identified and traceable form a record called an object graph. An object is considered live if it can be reached either directly from roots or from another live object. All other objects that are not live, i.e., unreachable, are considered garbage and their heap space can be reclaimed for reuse. The roots include both global state, e.g., global variables, and the local state of each thread, e.g., a threads stack. All live objects are marked in some way as to distinguish them as live objects; either by marking bits in an object header or by setting bits in some auxiliary data structure such as a bit map. See descriptions of FIG. 2, infra, for details.

The write barrier records mutations to objects during the concurrent marking phase.

In the concurrent cleaning phase, the mutator re-scans any updated objects. The mutator, the optimized write barrier and the garbage collector all run concurrently. See descriptions of FIG. 3, infra, for details.

In the traditional mark-sweep-compact garbage collection phase all heap space occupied by unmarked objects is reclaimed and added to a free list for re-allocation. This is a "stop-the-world" garbage collection as all threads, i.e., mutators, must be stopped while the garbage collection is taking place which can lead to long pause times.

The method of the present invention improves conventional concurrent garbage collection in multiple aspects.

First, the method of the present invention optimizes the conventional bit marking write barrier by employing the log to record the addresses of updated slots containing object addresses such that the updated references can be determined during re-scanning by revisiting addresses in the log, as such only those slots which have changed are revisited during rescanning whereas a conventional bit marking write barrier will revisit all slots in one or more objects.

Second, the method of the present invention also optimizes the conventional write barrier by employing a bitmap to ensure a slot is logged only once, regardless of the number of updates to the slot. Consequently, the optimized write barrier will only log the latest mutation per updated slot as opposed to a conventional address logging write barrier which log the address of the mutated object for each mutation. This reduces the re-scanning overhead and possibly log footprint of a conventional address logging write barrier.

Finally, the optimized write barrier reduces the amount of floating garbage by logging the address of the slot in the object that was updated rather than logging a value of the slot as in a conventional address logging write barrier. The optimized write barrier also reduces the memory footprint of the conventional address logging write barrier by guaranteeing that the address of any updated slot is stored only once using a bitmap to track whether the updated slot had previously been updated. The optimized write barrier also improves a processing overhead of a conventional bit marking write barrier by eliminating the need to rescan multiple slots by logging the updated slot addresses that need re-scanning.

Figure 2:
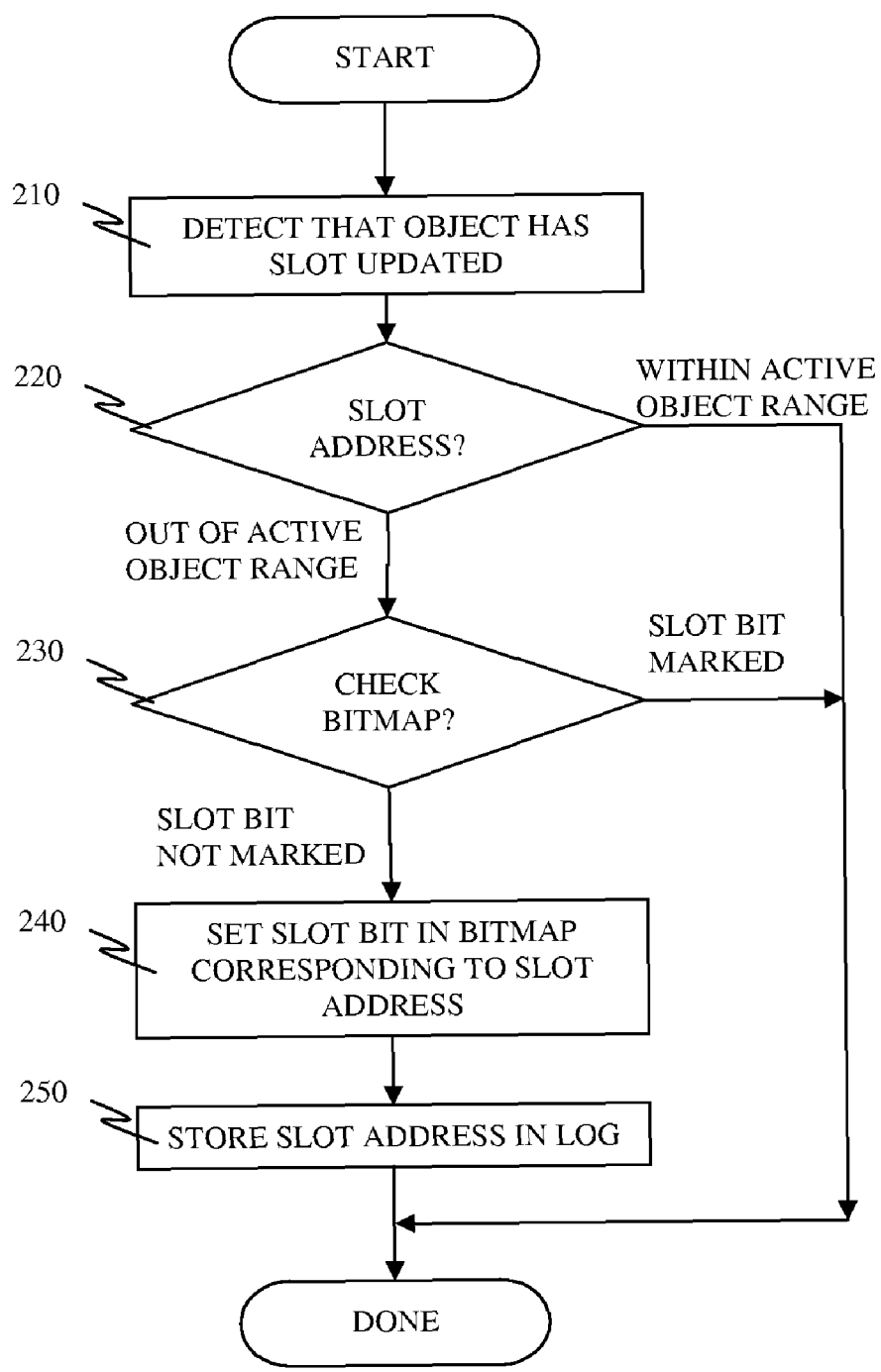
FIG. 2 is a flowchart depicting steps of the optimized write barrier of FIG. 1, in accordance with the embodiments of the present invention.

FIG. 2 is a flowchart depicting steps of write barrier operation during the concurrent marking phase of concurrent garbage collection, in accordance with the embodiments of the present invention.

In step 210, the optimized write barrier detects an update to a slot in an object.

In step 220, the optimized write barrier determines whether the update slot is located within an active object range. If optimized write barrier determines that the updated slot is within the active object range, then the optimized write barrier terminates the concurrent marking phase because the garbage collector does not scan the update slot in the active object range. If optimized write barrier determines that the updated slot is out of the active object range, then the optimized write barrier proceeds with step 230.

In step 230, the optimized write barrier determines whether a bit corresponding to the updated slot in a bit map is set, indicating that there has been a previous update to the slot. If the optimized write barrier determines that the bit corresponding to the updated slot is set, then the optimized write barrier terminates the concurrent marking phase because the address of the updated slot is already stored in a log. If the optimized write barrier determines that the bit corresponding to the updated slot is not set, then the optimized write barrier proceeds with step 240.

In step 240, the optimized write barrier sets the bit corresponding to the updated slot in the write barrier bit array. The optimized write barrier proceeds with step 250.

In step 250, the optimized write barrier stores the address of the updated slot in the log.

Figure 3:
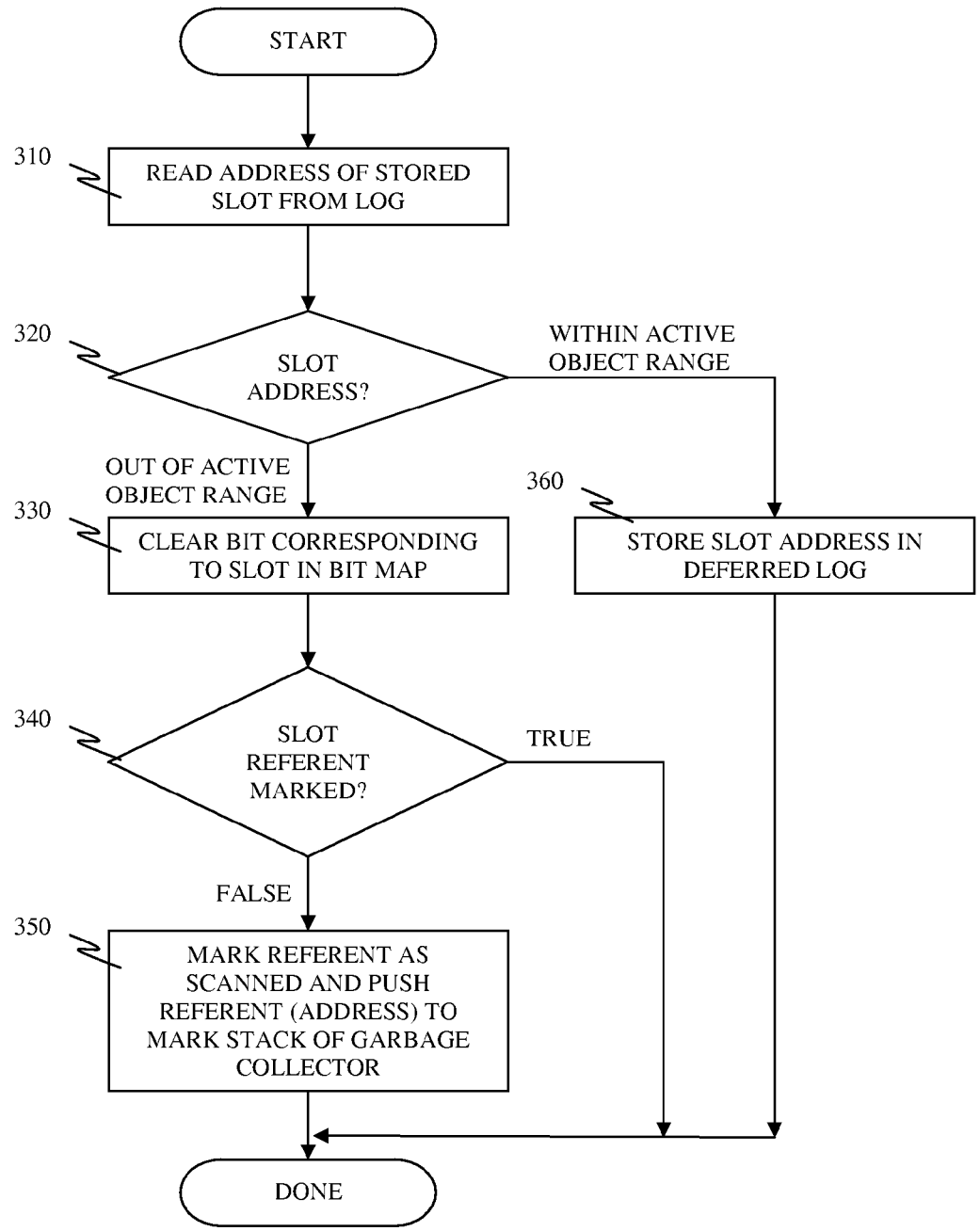
FIG. 3 is a flowchart depicting steps for the cleaning phase 1, in accordance with the embodiments of the present invention.

FIG. 3 is a flowchart depicting steps of a concurrent cleaning phase of the concurrent garbage collection, being performed by a mutator, in accordance with the embodiments of the present invention.

The cleaning phase starts at some point between the start of concurrent garbage collection and the final garbage collection cycle. The mutator concurrently executes the cleaning phase with application execution. Each mutator starts the cleaning phase by rescanning all updated slots logged during the concurrent marking phase to ensure that all live objects are marked.

In step 310, the mutator retrieves, from the log, an address of a slot that had been previously stored by the optimized write barrier.

In step 320, the mutator checks whether the slot is within an active object range. If the mutator determines that the slot is not within the active object range, then the mutator proceeds with step 330. If the mutator determines that the slot is within the active object range, then the mutator proceeds with step 360.

In step 330, the mutator clears the bit corresponding to the slot, in the bit map such that the optimized write barrier can mark subsequent updates to the slot in the bit map.

In step 340, the mutator determines whether a slot referent is marked. The slot referent is defined as an object referred to by the address stored in the slot. If the slot referent is marked, the mutator terminates the concurrent cleaning phase of the slot because the slot referent has already been identified as live. If the mutator determines that the slot referent is not marked, the mutator proceeds with step 350.

In step 350, the mutator marks the slot referent as live in the bitmap and pushes the address of the slot referent to a mark stack. The mark stack is a data structure used by the garbage collector for tracing all object reference chains from the roots.

In step 360, the mutator stores the address of the slot in a deferred log for later processing and terminates the concurrent cleaning phase for the slot because the address of the slot is in the active object range. By using the deferred log, the method of the present invention reduces the number of memory locations to be re-scanned because addresses stored in the deferred log is not rescanned upon each mutation. Also, the method of the present invention re-scans only the address of the updated reference stored in the deferred log, instead of rescanning an entire object or multiple objects as in conventional write barrier methods.

Subsequent to the concurrent cleaning performed in steps 310 to 360, the garbage collector performs the final collection which reclaims heap space occupied by objects that are not marked in the log. The garbage collector adds the reclaimed heap space to a free list for re-allocation.

Figure 4:
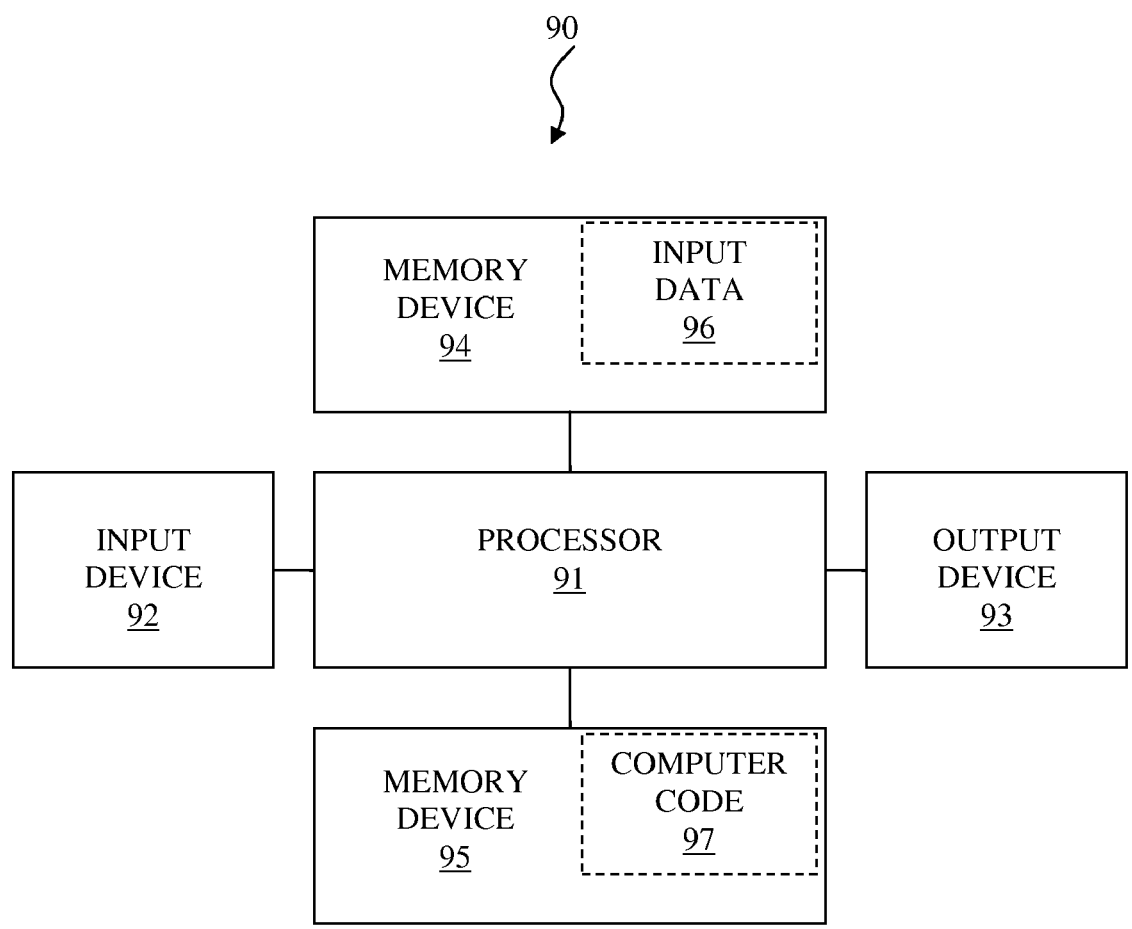
FIG. 4 illustrates a computer system used for optimizing a write barrier for garbage collection, in accordance with embodiments of the present invention.

FIG. 4 illustrates a computer system 90 used for optimizing a write barrier for garbage collection, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for optimizing a write barrier for garbage collection according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for optimizing a write barrier for a garbage collection, the method comprising:
   allocating an object that is referred by a data value of a slot;
   storing a dirtiness indicator of the slot in a bitmap and an address of the slot in a log; and
   subsequent to said storing, rescanning the log to discover an update to the stored address of the slot, said rescanning comprising:
      fetching a stored address of the slot from the log;
      subsequent to said fetching, determining that the fetched address of the slot is not within an active object range, wherein objects in said active object range is frequently modified;
      subsequent to said determining, confirming that another object that is referred to by a reference stored in the slot is not marked indicating that said another object has not been reached from a root or another reference in another object;
      subsequent to said confirming, unsetting the dirtiness indicator for the slot in the bitmap; and
      subsequent to said unsetting, marking said another object as live and pushing all of its object references to a mark stack, wherein the mark stack is a data structure used by a garbage collector for tracing all object reference chains from a respective root of each object reference,
   wherein a mutator performs said storing and said rescanning, wherein the mutator is a thread of execution in a virtual machine that performs the garbage collection.

2. A computer program product, comprising a computer usable storage medium having a computer readable program code embodied therein, said computer readable program code containing instructions that when executed by a processor of a computer system implement a method for optimizing a write barrier for a garbage collection, the method comprising:
   allocating an object that is referred by a data value of a slot;
   storing a dirtiness indicator of the slot in a bitmap and an address of the slot in a log; and subsequent to said storing, rescanning the log to discover an update to the stored address of the slot, said rescanning comprising:
    fetching a stored address of the slot from the log;
    subsequent to said fetching, determining that the fetched address of the slot is not within an active object range, wherein objects in said active object range is frequently modified;
    subsequent to said determining, confirming that another object that is referred to by a reference stored in the slot is not marked indicating that said another object has not been reached from a root or another reference in another object;
    subsequent to said confirming, unsetting the dirtiness indicator for the slot in the bitmap; and
    subsequent to said unsetting, marking said another object as live and pushing all of its object references to a mark stack, wherein the mark stack is a data structure used by a garbage collector for tracing all object reference chains from a respective root of each object reference,
wherein a mutator performs said storing and said rescanning, wherein the mutator is a thread of execution in a virtual machine that performs the garbage collection.

3. A computer system comprising a processor and a computer readable memory unit coupled to the processor, said memory unit containing instructions that when executed by the processor implement a method for optimizing a write barrier for a garbage collection, the method comprising:
    allocating an object that is referred by a data value of a slot;
    storing a dirtiness indicator of the slot in a bitmap and an address of the slot in a log; and
    subsequent to said storing, rescanning the log to discover an update to the stored address of the slot, said rescanning comprising:
        fetching a stored address of the slot from the log;
        subsequent to said fetching, determining that the fetched address of the slot is not within an active object range, wherein objects in said active object range is frequently modified;
        subsequent to said determining, confirming that another object that is referred to by a reference stored in the slot is not marked indicating that said another object has not been reached from a root or another reference in another object;
        subsequent to said confirming, unsetting the dirtiness indicator for the slot in the bitmap; and
        subsequent to said unsetting, marking said another object as live and pushing all of its object references to a mark stack, wherein the mark stack is a data structure used by a garbage collector for tracing all object reference chains from a respective root of each object reference,
    wherein a mutator performs said storing and said rescanning, wherein the mutator is a thread of execution in a virtual machine that performs the garbage collection.

* * * * *